(12) United States Patent
Valve et al.

(10) Patent No.: US 6,707,910 B1
(45) Date of Patent: Mar. 16, 2004

(54) DETECTION OF THE SPEECH ACTIVITY OF A SOURCE

(75) Inventors: Päivi Valve, Tampere (FI); Juha Häkkinen, Tampere (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/145,764

(22) Filed: Sep. 2, 1998

(30) Foreign Application Priority Data

Sep. 4, 1997 (FI) .................................................. 973596

(51) Int. Cl.[7] .............................. H04M 1/00; H04M 9/00
(52) U.S. Cl. .............................. 379/388.06; 379/388.04; 342/423
(58) Field of Search ...................... 379/387.01, 387.02, 379/388.04, 390, 80, 67.1, 68, 79, 388.06; 381/92; 367/118–129; 342/423

(56) References Cited

U.S. PATENT DOCUMENTS

| | | | |
|---|---|---|---|
| 3,922,488 A | 11/1975 | Gabr | 179/1 HF |
| 5,299,148 A * | 3/1994 | Gardner et al. | 702/196 |
| 5,313,661 A | 5/1994 | Malmi et al. | 455/232.1 |
| 5,410,595 A * | 4/1995 | Park et al. | |
| 5,539,859 A | 7/1996 | Robbe et al. | 395/2.42 |
| 5,715,310 A | 2/1998 | Hagqvist | 379/406 |
| 5,742,733 A | 4/1998 | Jarvinen | 395/2.29 |
| 5,828,997 A * | 10/1998 | Durlach et al. | 704/233 |
| 5,867,574 A * | 2/1999 | Eryilmaz | |
| 5,959,667 A * | 9/1999 | Maeng | 348/211.99 |
| 6,002,776 A * | 12/1999 | Bhadkamkar et al. | |

FOREIGN PATENT DOCUMENTS

WO    WO 97/07624    2/1997

OTHER PUBLICATIONS

Brandstein et al; "A Localization–Error–Based Method for Microphone–Array Design", ICASSP–96; 1996 IEEE Inter. Conf.; pp. 901–904; vol. 2.*
Johnson et al; "Array Signal Processing: Concepts and Techniques"; 1993, Pub. PTR Prentice Hall; pp. 382–390.*
Sturim, et al; "Tracking Multiple Talkers using Microphone Array Measurements"; ICASSP–97; 1997 IEEE Inter. Conf.; pp. 371–374; vol–1.*
"Acoustic Echo Cancellation Microphone System for Large–Scale Video Conferencing", Kuo et al., Proceedings of ICSPAT'94.
"A Source Subspace Tracking Array of Microphones For Double–Talk Situation", Affes et al., Proceedings of ICSPAT'96, vol. 2.
"A Practical Methodology For Speech Source Localization With Microphone Arrays", Brandstein et al., Computer Speech And Language, vol. 11, No. 2, pp 91–126, 1997.
"A Microphone Array For Car Environments", Grenier, Speech Communication, vol. 12, No. 1, pp 25–39, 1993.

* cited by examiner

Primary Examiner—Forester W. Isen
Assistant Examiner—Ramnandan Singh
(74) Attorney, Agent, or Firm—Perman & Green, LLP

(57) ABSTRACT

The scope of the present invention is a device for detecting the source of a voice, which device comprises microphone means (2; 2a, 2b, 2M) for receiving a voice signal and detecting means for detecting the voice from the received voice signal. The device comprises means (15, 17) for determining the direction of arrival of the received signal, means (17) for storing the assumed direction of arrival of the voice of a certain source and means (18) for comparing the direction of arrival of said received signal with said assumed direction of arrival. The device further comprises means (18) for indicating that the source of the voice is said certain source when the comparison proves that the direction of arrival of said received signal matches with said assumed direction of arrival within a certain tolerance.

11 Claims, 9 Drawing Sheets

DETECTION OF THE SPEECH ACTIVITY OF A SOURCE

FIELD OF THE INVENTION

The present invention relates to a method and a device for detecting the source of a voice comprising microphone means for receiving a voice signal and detection means for the detection of the voice in the received voice signal.

BACKGROUND OF THE INVENTION

A telephone conversation is often disturbed by echo. This concerns in particular full-duplex telephones which have four different speech states: idle, near-end speech, far-end speech and double-talk. The echo occurs usually when speech is coming from the far end, when the received far end signal is reproduced in a loudspeaker and is returned to the far end through a microphone. The echo problem occurs in particular in such hands-free solutions, in which a loudspeaker reproduces the voice with high volume to the surroundings and the voice from the loudspeaker thus is easily returned to the microphone.

Adaptive signal processing is used in order to remove the echo. In a hands-free application of a mobile telephone it is possible to effectively eliminate the very disturbing acoustic feedback from the loudspeaker to the microphone—the acoustic echo—by using prior known echo cancellers and echo suppressors. An echo canceller can be realized using an adaptive digital filter which usually suppresses the echo signal from an outgoing signal, i.e. the signal which has come from the far end, when a far-end signal is present at the reception. In this way it is striven for to prevent a far-end signal from returning to the far-end. The parameters of the adaptive filter are usually updated always when far-end speech occurs in order to take into account the conditions of any situation as accurately as possible. An echo suppressor on its behalf is used to attenuate the near-end signal to be transmitted.

Such a situation in which near-end and far-end speech occur simultaneously is called a double-talk situation. During double-talk an echo canceller is not capable of effectively removing an echo signal. This is due to the fact that the echo signal is summed in the near-end signal to be transmitted, in which case the echo canceller is not capable of forming an accurate model of the echo signal to be removed. In such a case the adaptive filter of the echo canceller is not capable of adapting in a correct way to the acoustic response of the space between the loudspeaker and the microphone and accordingly is not capable of removing the acoustic echo from the signal to be transmitted, if the near-end speech signal is present. A double-talk detector is often used because of this in order to eliminate the disturbing effect of double-talk on the echo canceller. A double-talk situation is usually detected by detecting whether there is near-end speech simultaneously with far-end speech. During double-talk the parameters of the adaptive filter of the echo canceller are not updated, but the updating of the adaptive filter has to be interrupted while the near-end person speaks. Also an echo suppressor requires the information about the speech activity of the near-end speaker in order to not incorrectly attenuate (too much) the signal to be transmitted while the near-end person is speaking.

In addition to echo cancelling and -suppressing, the information about near-end speech activity is needed for the interruptable transmission used in GSM-mobile telephones. The idea of the interruptable transmission is to transmit a speech signal only during speech activity, i.e. when the near-end speaker is quiet the near-end signal is not transmitted in order to save power. In order to avoid excessive variations of background noise level due to the interruptable transmission, it is possible to transmit in the idle-state some comfort noise and still save bits needed in the transmission. In order to that the interruptable transmission of the GSM would not reduce the quality of the transmitted speech, the near-end speech activity must be detected accurately, quickly and reliably.

FIG. 1 presents prior known arrangement 1 for echo cancelling and double-talk detection. Near-end signal 3 comes from microphone 2 and it is detected using near-end speech activity detector 4, VAD (Voice Activity Detector). Far-end signal 5 comes from input connection I (which can be the input connector of a hands-free equipment, the wire connector of a fixed telephone and in mobile telephones the path from an antenna to the reception branch of the telephone) and it is detected in far-end speech activity detector 6, a VAD, and finally it is reproduced with loudspeaker 7. Both near-end signal 3 and far-end signal 5 are fed to double-talk detector 8 for the detection of double-talk and to adaptive filter 9 for adapting to the acoustic response of echo path 13. Adaptive filter 9 gets as an input also the output of double-talk detector 8, in order to not adapt (parameters are not updated) the filter during double-talk. Model 10 formed by the adaptive filter is subtracted from near-end signal 3 in summing/subtracting unit 11 in order to perform the echo cancelling. To output connection O (which can be the output connector of a hands-free equipment, the wire connector of a fixed telephone and in mobile telephones the path through transmission branch to antenna) it is brought echo canceller output signal 12, from which some (of the) echo has been cancelled. It is possible to realize the echo canceller presented in FIG. 1 integrated in a telephone (comprising for example a loudspeaker and microphone for hands-free loudspeaker call) or in a separate hands-free equipment.

Several methods for the detection of double-talk have been presented. Many of these however are very simple and partly unreliable. Most double-talk detectors are based upon the power ratios between loudspeaker signal and/or microphone signal and/or the signal after an echo canceller. The advantages of these detectors are simplicity and quickness, their disadvantage is the unreliability.

Detectors based upon the correlation between a loudspeaker signal and/or microphone signal and/or the signal after an echo canceller are also prior known. These detectors are based upon an idea, according to which a loudspeaker and a mere echo signal in a microphone (the signal after an echo canceller) are strongly correlated, but when a near-end signal is summed in the microphone signal the correlation is reduced. The disadvantage of these detectors are slowness, the (partly incorrect) assumption of the non-correlation between near-end and far-end signals, and the effects of the changes on a loudspeaker signal caused by the echo path: a reduced correlation also with absent near-end signal.

It is also prior known a double-talk detector based upon the comparison of the autocorrelation of the same signals, according to which the detector recognizes the voice in a near-end signal and thus can detect the presence of the near-end signal. Such a detector has less calculation power, but it suffers from the same problems as the detectors based upon correlation.

In publication Kuo S. M., Pan Z., "Acoustic Echo cancellation Microphone System for Large-Scale Video Conferencing", Proceedings of ICSPAT'94, pp. 7–12, 1994 it has been utilized two microphones directed to opposite directions for the removing of noise and acoustic echo and for the recognizing of the different speech situations mentioned in the beginning. The method in question does however not bring any particular improvement in the recognizing of double-talk, which is performed merely according to the output power of the echo canceller.

In publication Affes S., Grenier Y., "A Source subspace Tracking array of Microphones for Double-talk Situations", Proceedings of ICSPAT'96, Vol. 2, pp. 909–912, 1996, it has been presented an echo and background noise-canceller of microphone vector structure. The presented echo canceller filters signals coming from a spatially chosen direction maintaining the signals coming from a desired direction. The echo canceller in question is capable of operating also during double-talk situations. However, the publication does not present near-end speech activity detection nor double-talk detection using a multi-microphone solution (also called a microphone vector).

SUMMARY OF THE INVENTION

Now it has been invented a method and a device for the detection of near-end speech activity and the recognizing of double-talk situations. The invention is based upon the detection of a near-end speech signal based upon the direction it comes from. In hands-free applications, in which a loudspeaker signal comes from a direction clearly different from the direction of the speech signal of a near-end speaker, the near-end speech signal can be distinguished from the loudspeaker signal based upon their angles of arrival. In the invention the detection is performed using several microphones (a microphone vector), which pick the voice from different directions and/or different points.

The outputs of the microphone vector are band-pass filtered first into narrow-band signals and a direction of arrival angle estimate is performed on the signal matrix formed by the filtered signals. The estimating restores the spatial spectrum, from which the arrival directions are tracked based upon peaks occurring in the spectrum. The arrival directions of the near-end speech signal and that of the loudspeaker signal are updated based upon the obtained arrival directions. These assumed values of the arrival directions make making a final VAD decision easier. If the arrival direction estimator detects a sufficiently strong spectrum peak in the arrival direction, which is close enough to the assumed arrival direction of the near-end speech signal, the near-end speaker is regarded to be speaking, i.e. near-end speech activity can be detected.

For a double-talk decision it is required, in addition to near-end speech activity, the information about far-end speech activity, which can be detected by using a prior known voice activity detector, for example a voice activity detector based upon power levels (see FIG. 1).

A device according to the invention is characterized in that it comprises means for determining the direction of arrival of a received signal, means for storing the assumed direction of arrival of the voice of a certain source and means for comparing the directions of arrival of said received signal and said assumed direction of arrival and means for indicating that the voice has been originated in said certain source when said comparison indicates that the direction of arrival of said received signal matches with said assumed direction of arrival within a certain tolerance.

BRIEF DESCRIPTION OF THE DRAWINGS

The invention is explained in detail in the following with reference to enclosed drawings, of which

DETAILED DESCRIPTION

Figure 1:
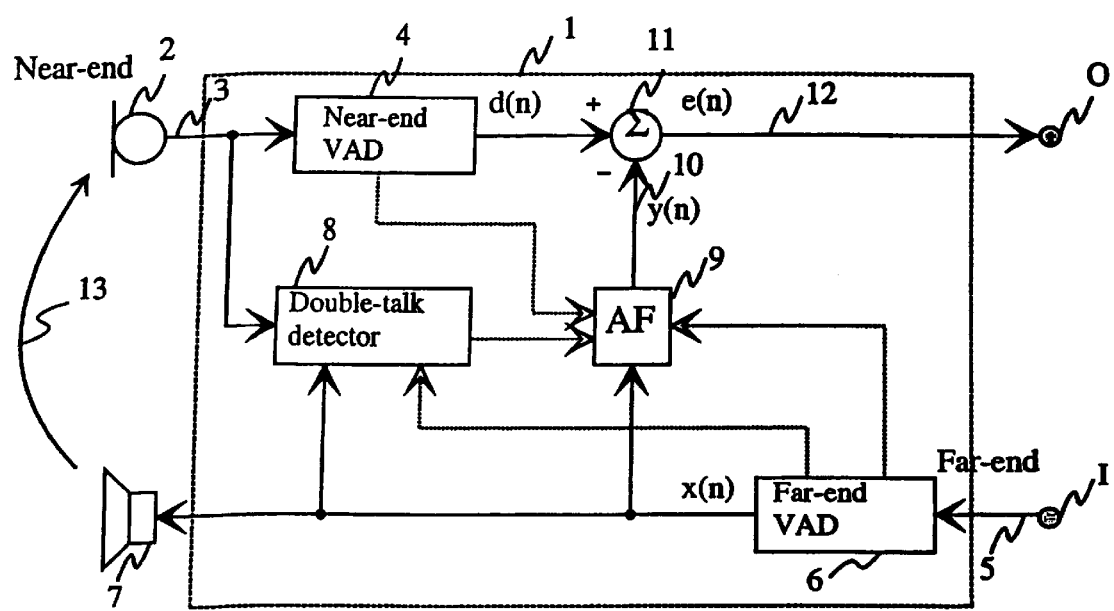
FIG. 1 presents the block diagram of a prior known echo canceller.
Figure 2:
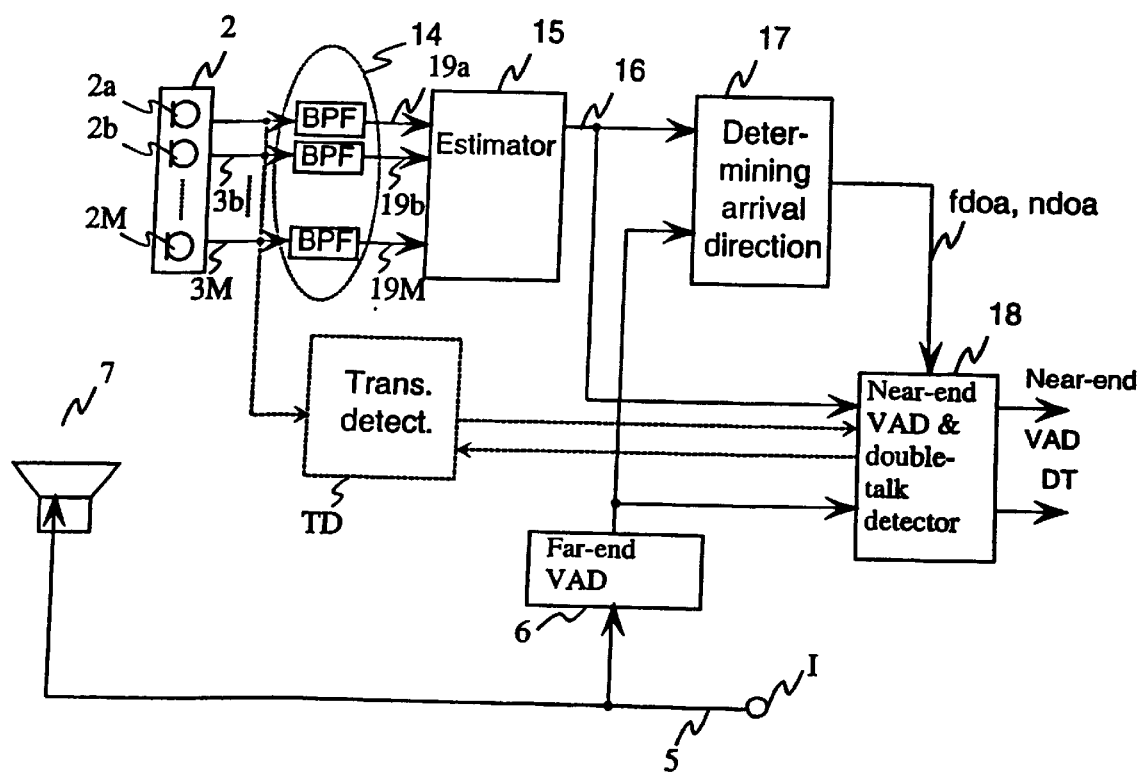
FIG. 2 presents the block diagram of a detector according to the present invention.

FIG. 2 presents the block diagram of a detector, according to the present invention, for the detection of near-end voice activity and recognition of double-talk. In the invention it has been used several microphones $2a$, $2b$, ..., $2M$ as microphone 2, which microphones have preferably been connected as so called microphone vector 2. A vector has at least two microphones, but preferably three or four microphones or more. Each microphone produces a single signal $3a$, $3b$, ..., $3M$, in which case if M pieces of microphones (M is a whole number) is used, it is obtained M pieces of in time domain variable signals which form one, in time domain variable signal vector comprising M elements.

Outputs $3a$, $3b$, ..., $3M$ of microphone vector 2 are first band-pass filtered into narrow-band signals $19a$, $19b$, ..., $19M$ in band-pass filters 14. The band-pass filtering is performed for a direction angle estimating, because the accurate estimating methods of superresolution spectrum only work on narrow-band signals. The band-pass filtering can be realized for example using a fast Fourier transform (FFT, Fast Fourier Transform), by windowing and interleaving. The frequency range of the band-pass filters is determined based upon the distance between the microphones in the microphone vector. Because according to the Nyqvist sampling theorem a spatial sampling frequency must be at least two times the spatial frequency of the signal, it is obtained as the pass-band frequency (point-frequency) of band-pass filters 14: $f=c/2d$, in which c is the velocity of sound in air (343 m/s at 20° C.) and d is the distance between the microphones.

An estimating of the direction angle (i.e. arrival direction) on the signal matrix formed by filtered signals $19a$, $19b$, ..., $19M$ is performed in estimator 15 using some prior known estimating method, for example MUSIC (MUltiple SIgnal Classification).

Figure 3:
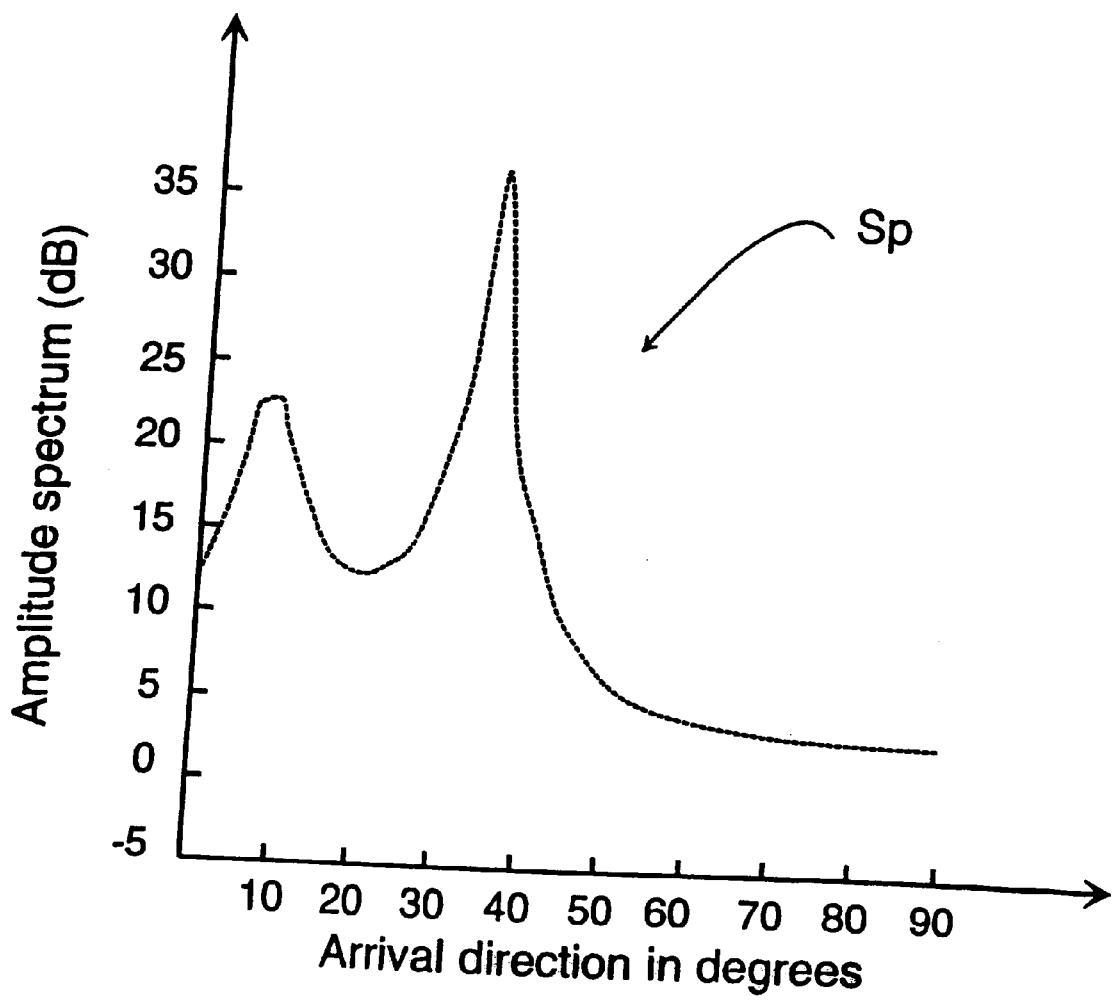
FIG. 3 presents the spatial spectrum diagram of a microphone vector signal.

The estimating method restores the spatial spectrum, from which the arrival directions of the signals are determined based upon the peaks occurring in the spectrum. FIG. 3 presents an example of such a spatial spectrum of a microphone vector signal. The arrival directions can be determined from the spectrum diagram presented in FIG. 3 for example by examining the derivate of the spectrum curve. Such zero-points of the derivate are restored as arrival directions, in which the derivate changes from positive to negative, which, as it is prior known, indicates the locations of the peaks in a curve. In FIG. 3 thus two signals arrive in the microphone vector, one from direction 10° and a second one from direction 40°. It can further be required that spectrum peaks regarded as arrival directions shall have a certain minimum amplitude (for example 5 dB). In the figure the coverage of the spectrum has been presented as 90°. In practice it is possible to detect in the range of ±90°. The calculating of the derivate and the checking of meeting the amplitude minimum condition must be performed preferably using a digital signal processor (by programming). Estimator 15 gives as an output the arrival directions 16 of the signals.

Figure 4:
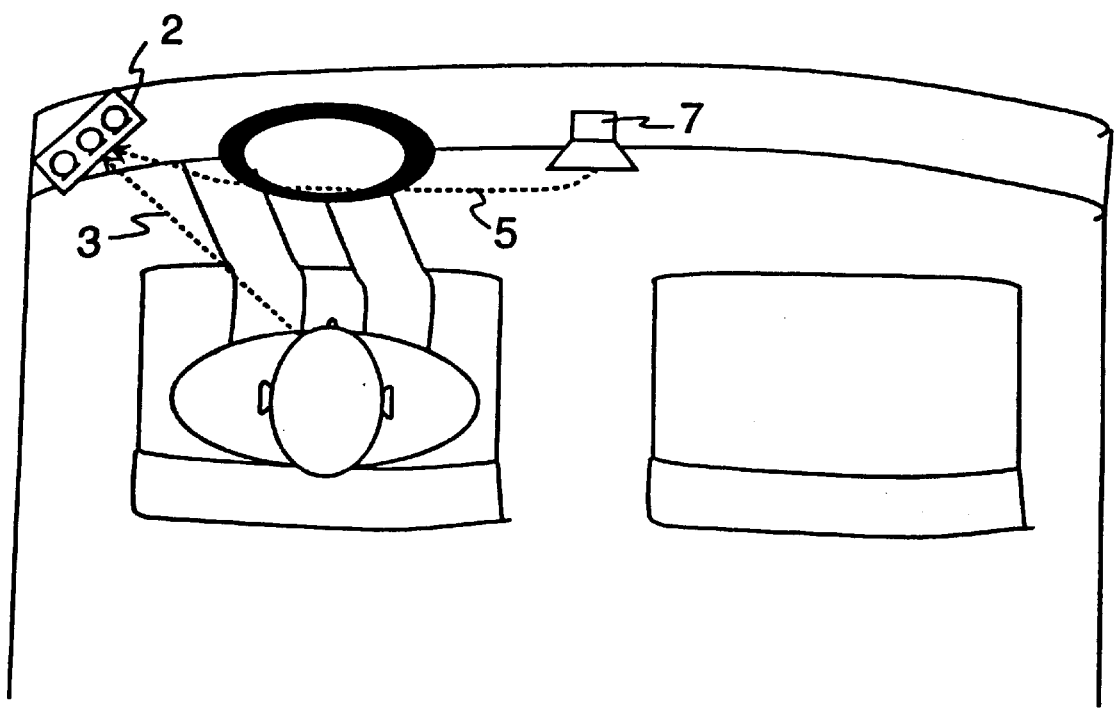
FIG. 4 presents the locations of a microphone and a loudspeaker in a car.

The assumed arrival directions of near-end speech signal 3 and loudspeaker signal 5 are updated in block 17 based upon obtained arrival directions. The probable directions of arrival can be assessed by averaging the arrival directions obtained from spectrum peaks. When it is approximately known from which directions the signals arrive, the effect of error peaks occurring at times in the spatial spectrum can be minimized. Unless an error peak occurs at an assumed direction of arrival, it is not noted. FIG. 4 presents the placing of microphone 2 and loudspeaker 7 of a normal hands-free-equipment in a car, in which a speaker is usually rather directly in front of microphone vector 2, in direction 0°±40°. The location of a loudspeaker may vary rather much in respect with the microphone vector. Microphones 2a, 2b, . . . , 2M of microphone vector 2 are placed at a certain distance in a certain direction from each other. The distances and directions must be known by the arrival direction estimate algorithm, which is explained in the following. In the following it is explained in more detail the averaging of both far-end and near-end arrival direction, which is performed in signal source location direction determining block 17.

The estimating of far-end arrival direction is based upon the averaging of arrival-angles 16 obtained from spectrum estimator 15. The averaging is only performed when there is speech present in the far-end, which is found out using the output of far-end VAD 6, which output is brought to determining block 17. The averaging is preferably performed in time domain using for example IIR-filtering. The basic assumption is that there are two signal sources, near-end signal 3 and far-end signal 5, coming from different directions. It is further assumed that the arrival directions of said signals change rather slowly compared with the frequency of the observations performed. When spectrum estimator 15 gives arrival direction vector doa (in degrees) as its output, far-end arrival direction vector estimate fdoa (in degrees) is updated by averaging in such a way that each new direction estimate has an effect on the component of fdoa which it is closest to. The updating can be weighted in such a way that the detected direction updates the fdoa-component the more the closer to the concerned component it is. The direction of the loudspeaker signal and the directions of the reverberation signals caused by it in the spectrum change very little, in which case the above weighing reduces the effect of occasional, erroneous peaks in the spectrum. At the same time the probability of occurrence of the fdoa-component in question, pdoa, is updated the more the closer to the direction estimate concerned a new value is. Additionally, the strength of the concerned fdoa-component, powdoa, is updated based upon the power of the spectrum peak corresponding it. In this case far-end arrival direction estimate vector fdoa comprises the direction of arrival-angles of M−1 signals. Component pdoa comprises the probabilities of corresponding arrival directions in range [0,1] and the normalized strengths in range [0,1] corresponding with powdoa.

Now it can be assumed that the arrival direction of far-end signal 5 is the component of far-end arrival direction vector estimate fdoa, the probability and strength corresponding with which are highest, and which on the other hand is closest to the last determined far-end signal arrival direction. Because estimates are updated only when speech is present in the far-end, it can be assumed that near-end signal 3 (in this case double-talk) occurs less than 50% of time. The basic assumption is accordingly that double-talk occurs less than half of the far-end speech activity time. The far-end signal arrival direction (the direction of the loudspeaker) can be separated from the arrival directions of reverberated loudspeaker signals based upon the powers of the spectrum peaks corresponding to the arrival directions. A signal arriving directly to a microphone normally causes in a spatial spectrum a stronger peak than signals attenuated in the reverberation path.

Figure 7:
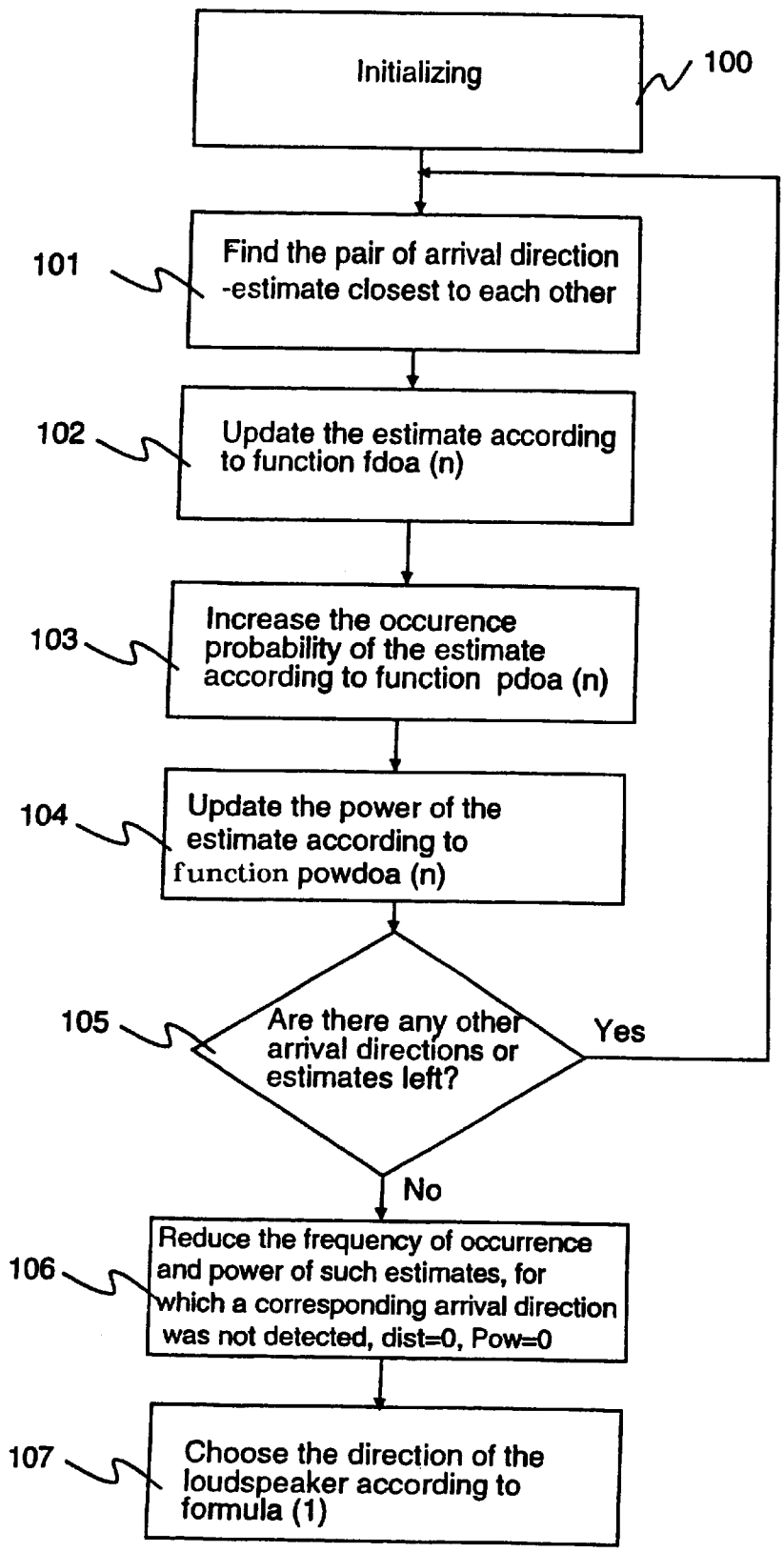
FIG. 7 presents the estimating of the direction of arrival in the form of a flow-diagram.

The following is a description of an algorithm for estimating the direction of arrival with reference to FIG. 7:

In stage 100 it is performed an initializing comprising the following determinations:

fdoa, pdoa and powdoa contain M−1 components doa contains L components (1≦L≦M−1)

fdoa-components are initialized using different values:

$fdoa(n)=-90+n*180/M; (1 \leq n \leq M-1)$

Stage 101: Track the estimates (components of fdoa) corresponding to the detected directions of arrival (doa) as follows:

Calculate the distance of each direction of arrival from each estimate. Choose the estimate having the shortest distance doa(i) and the closest estimate fdoa(n) corresponding to it.

Figure 5:
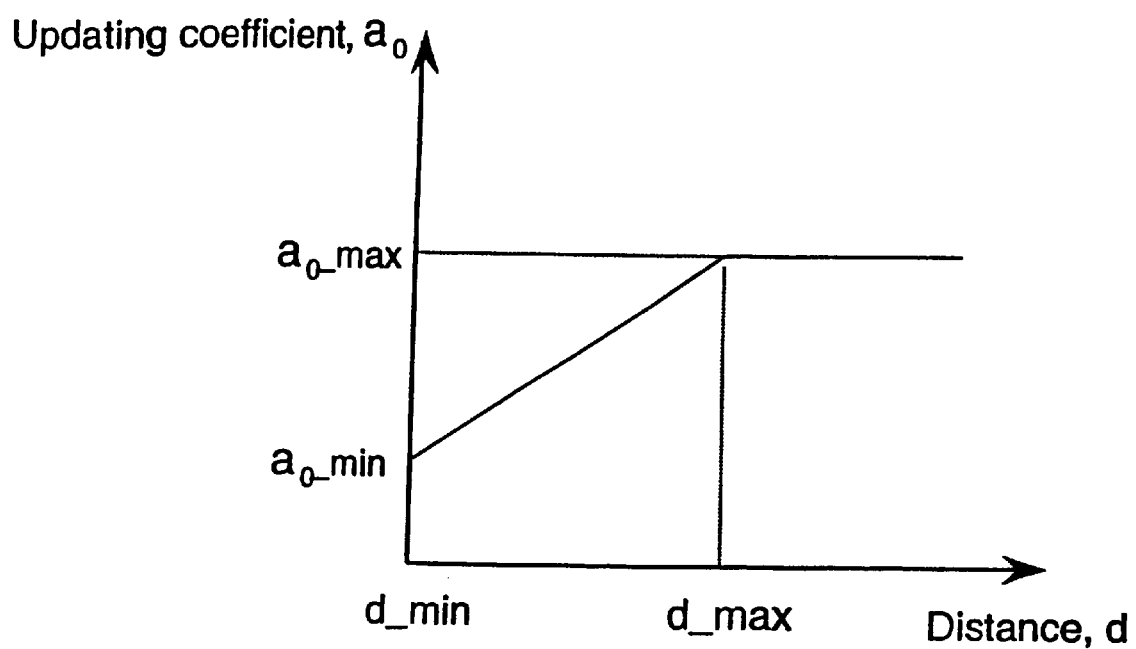
FIG. 5 presents the updating factor used in the estimating of the direction of arrival as a function of distance (in degrees)

Stage 102: Update estimate fdoa(n) according to how close to the estimate the direction of arrival doa(i) is; the closer, the more the detected direction changes the estimate:

$fdoa(n)=\alpha_0*fdoa(n)+(1-\alpha_0)*doa(i)$, in which $\alpha_0$ is for example a linear or an exponential function of distance (see FIG. 5 about linear dependence). By adjusting the maximum and minimum limits of updating factors $\alpha_0$ and distance d, $\alpha_0\_max$, $\alpha_0\_min$ and d_max, d_min, it can be influenced not only on the quickness of the updating but also on at which distance located peaks have an effect on the estimate. If for example the maximum of the distance is kept at 40 degrees (d_min=0°, d_max=40°), and the maximum of the updating factor is kept at one ($\alpha_0\_min=0.99$, $\alpha_0\_max=1.0$), spectrum error peaks farther way than 40 degrees will not update the estimate and thus cause no error at all. In this way it is possible to eliminate the effect of above mentioned false signals on the estimating.

Stage 103: Increase the probability of occurrence, pdoa, of the estimate again according to how close to the estimate a direction of arrival is. In the following the function of the distance has been assumed to be linear. Any other, for example an exponential one is also possible.

$pdoa(n)=\alpha_1*pdoa(n)+(1-\alpha_1)(1-dist/180)$, in which $\alpha_1$ is for example 0.9, and dist is the distance between an observation and an estimate, in the range [0,180].

Stage 104: Update also the power of the estimate powdoa using the power of the detected spectrum peak as follows:

$powdoa(n)=\alpha_3*powdoa(n)+(1-\alpha_3)*Pow/Powmax$, in which $\alpha_3$ is for example 0.9, Pow is the power of a spectrum peak, and Powmax is the so far highest power.

In stage 105, find out if other directions of arrival and estimates can be found, if yes, repeat stages 101–104 on the remaining direction of arrival—estimate pairs.

Stage 106: Reduce the frequency of occurrence and power of such estimates for which no direction of arrival has been detected, for example by setting dist=180 and Pow=0.

After this, choose in stage 107 for the direction of the loudspeaker the direction of the estimate the direction of which has the highest probability of occurrence and power, and which is closest to latest interpretation of the direction of the loudspeaker for example by maximizing the following expression:

$$a*pdoa(k)+b*powdoa(k)+c*distance(k); k=1,\ldots,M-1, \quad (1)$$

in which a, b and c are weighting coefficients, for example 1/3, distance (k) is the distance in degrees between estimate fdoa(k) and the previous interpreted direction of the loudspeaker.

In the above it has been explained the estimating of the direction of arrival of a far-end speech signal. The estimating of the direction of arrival of a near-end speech signal is explained in the following. The estimating of the direction of arrival of a near-end signal is performed in accordance with the above explained procedure and algorithm, and thus an near-end direction of arrival estimate ndoa is obtained by substituting in the above algorithm the fdoa's with ndoa. The estimating is performed when far-end speech activity detector 6 indicates that there is no speech coming from the far-end. When detecting this spectrum in estimator 15 there are no peaks (direction of arrival angles) to be expected, or one to M−1 peaks corresponding with the direction of a near-end signal and/or false signals and reverberations. As the direction of a near-end speaker it is chosen, as above, the direction indicated by the spatial spectrum which is repeated most often and which is the strongest one. It can further be assumed that the near-end speaker is sitting approximately at direction 0°±30° to the microphone vector, in which case the initial value of the near-end speaker direction estimate can be set=0° and in the choosing of the direction it can be strongly weighted the previous interpreted direction.

These assumed direction of arrival-values fdoa, ndoa are taken to detection block 18 performing the final detection. If direction of arrival estimator 15 has detected a sufficiently strong spectrum peak in the arrival direction, which peak is sufficiently close to the assumed direction of arrival of the near-end speech signal, the near-end speaker is found to be speaking, i.e. near-end speech activity is detected. This comparing is performed in detector 18 based upon signals coming to it from blocks 15 and 17. The final decision of the near-end speech activity is made using spectrum peaks and direction of arrival-estimates (averaging). It is detected that speech is present in the near-end if any spectrum peak is closer to the near-end direction of arrival-estimate than to the far-end estimate (or that of its reverberation), and further, closer to the near-end estimate than a given error tolerance. The value of the tolerance is for example 10 degrees.

For a double-talk decision it is required, in addition to near-end speech activity, the information about far-end speech activity, which information is obtained from far-end speech activity detector 6 to double-talk detector 18, which thus detects a double-talk situation if the near-end speech activity detector (explained above) has detected speech and far-end speech activity detector 6 has simultaneously detected speech. Any VAD-algorithm can be used for the detection of speech activity as far as the far-end signal is concerned. A double-talk result is obtained using a simple AND-operation on the near-end and far-end speech activity values, 1 (speech) and 0 (no speech).

In the following it is explained, with reference to FIG. 2, the function of transient detector TD, which detector is optional in a speech activity detector/double-talk detector according to the invention and thus has been presented using a dashed line in the figure. Because the direction of arrival estimating is made on narrowband signals, detecting fast near-end signal changes (transients) is difficult. Because of this, it is possible to use a parallel detector TD optimized for transients detection. A direction of arrival-detector is used after each detected transient location for checking the correctness of a decision. If the detector according to the invention detects signal changes sufficiently quickly, for example in less than 20 ms, there is no need to use transient detector TD.

In principle it is possible to use as a transient detector a normal VAD. However, because a multi-microphone structure makes it possible to attenuate certain direction of arrival-angles, transient detector TD can be realized in such a way that the direction of assumed loudspeaker signal is attenuated. In this case the probability of a detected transient being connected with the near-end signal is increased. The attenuation in the loudspeaker direction can be realized in a number of different methods. The easiest way is to use an adaptive two-microphone construction. In principle it is possible to use as these two microphones any two of microphones 2a, 2b, ..., 2M of microphone vector 2, for example the microphones farthest away from each other. In order to realize the attenuation it is sufficient that we have two microphone signals. When the adapting is controlled using the decision of a direction of arrival-estimator (i.e. adapting is performed only when only a far-end signal is present), an attenuation in the desired direction is obtained. The adapting becomes easier if the detecting is performed at a certain frequency range (for example 1 kHz–2 kHz). A frequency division can be carried out in the transient detector directly on signals obtained from the microphone using for example FFT or a band-pass filter.

The actual transient detector TD compares the instantaneous power P(n) of a signal at moment n to noise estimate N(n) in which P(n) is the power of a microphone signal (or that of a microphone signal in which the loudspeaker signal direction has been attenuated), and noise estimate N(n) is the corresponding power, averaged using its old values, controlled by the decisions of the whole system when no speech is present at all. The information about such instants with no speech can be taken from block 18 to transient detector TD (dashed-line arrow). The values concerned, P(n) and N(n) can be calculated using the transient detector based upon a signal coming from the microphone (the calculating of signal output values P(n) and N(n) is prior known and it can be performed in transient detector TD using for example an IIR-filter, (Infinite Impulse Response). If the difference is sufficiently big, it is decided that a transient has been found. In the updating of noise estimate N(n) it is used recursive averaging N(n+1)=αN(n)+(1−α)P(n), in which α is a time constant (typically ca. 0.9) controlling the averaging.

A transient detector supplements the function of a spatial detector according to the invention. It is also possible to detect just near-end speech with transient detector TD, but the certainty on the subject is obtained from the decision of direction of arrival-estimator 15. An incorrect transient detection at the source of mere echo (no near-end signal) can be corrected with direction of arrival-estimator 15. If the direction attenuation operates sufficiently well, there is no need to pay attention to transients caused by echo during near-end speech. Near-end speech started during echo can again be detected as a distinct transient, and the result can be checked using a direction of arrival-detector. The output of transient detector TD is taken to block 18 (dashed line).

Near-end speech activity and double-talk can also be determined based on the output of the direction of arrival-estimator 15 by a statistical pattern recognition approach. According to this approach speech activity detection on the basis of direction-of-arrival (DOA) angle estimation could possibly be improved by utilising statistical information. Pattern recognition techniques, such as neural networks and hidden Markov models (HMM), have been successfully applied to many similar problems. The strength of the pattern recognition methods comes from trainability. Given sufficient amount of training data, we can estimate models for each state of the system (near end speech, far end speech, double-talk, silence). These models can then be used to perform optimal detection of the system state. It goes without saying that the detection process is optimal only as long as the modelling assumptions are correct.

In following it is briefly outlined how HMMs could be used for multi-microphone speech activity detection. Since the input to the system is still derived from the spatial spectrum, the DOA angle of the signal(s) remains the deciding factor in accordance with the invention. Moreover, the transient detection part (reference TD) explained above can be used as before.

Figure 8:
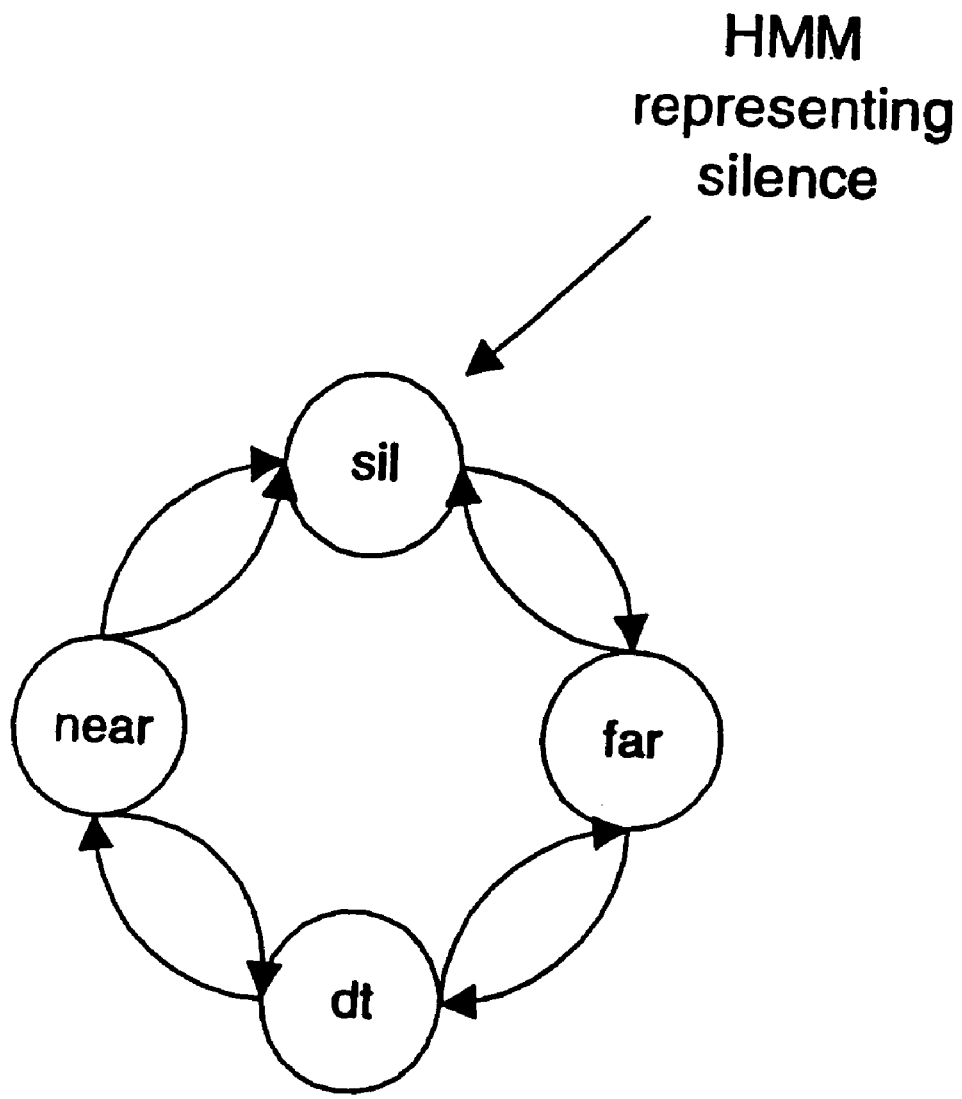
FIG. 8 presents transitions between different states in an alternative embodiment.

The first step in HMM-based pattern recognition is to define the model network. As already mentioned, there are four states (models) in a full-duplex telephone system: near end speech, far end speech, double-talk, silence. Each model could be modelled with a multi-state HMM, but a single state HMM can be used as the starting point. Another potential enhancement is to use minimum duration constraints on the states to prevent oscillations between the states. Theoretically, transitions can occur between any two models, but in practice, direct transitions between the silence and the double-talk models and between the near end and the far end models can be denied so the practical transitions are as shown in FIG. 8.

Figure 9:
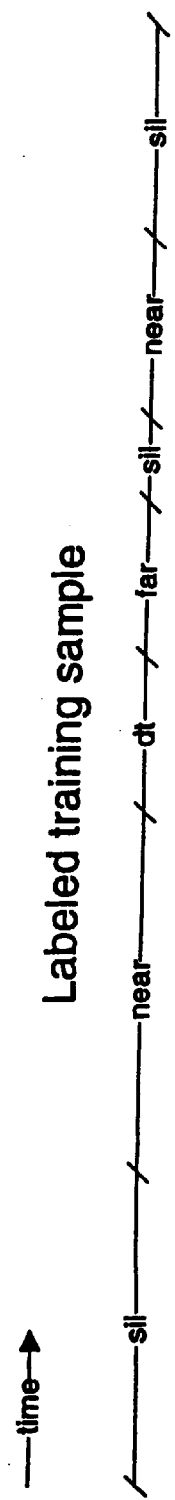
FIG. 9 presents labelled training data.

Once the model structure has been defined, one must decide what kind of probability distributions are used. The standard approach in speech recognition is to model each state by a Gaussian probability density function (pdf), which is a good starting point here as well. Any pdf could be used instead. The training of the model pdfs is ideally performed by maximum-likelihood parameter estimation from labelled (the system knows in which state it is at any given moment) training data as shown in FIG. 9. An alternative is to start with a certain general model, and let the system adapt on-line, which is called unsupervised training. Once again referring to speech recognition, there exist several on-line speaker adaptation techniques that could be applied to this. In summary, the state producing the highest likelihood is adapted with the largest weight using the current data. The more adaptation data there is, the more weight it will be given in the update. The obvious problem of unsupervised training is the risk of adapting incorrect models in the case of misclassifications. If the initial parameters can be estimated with a few supervised training samples the adaptation is likely to perform better. Moreover, the far-end channel (loudspeaker) is separated from the rest and this information can be utilised. When there is far-end activity, only far and double-talk models can be adapted and so on.

The actual detection (recognition) is quite simple: we just choose the model producing the highest likelihood at any time. Of course, additional information, such as far-end speech activity, can be used to improve the detection performance even further. A logical enhancement of this alternative approach is to use HMMs with several states. For instance, an HMM representing each system state could comprise three states: a transition state into the model, a state representing the stationary part of the model, and a transition state out of the model. Also, mixtures of Gaussian pdfs could be used to improve the accuracy of pdf modelling.

When a detector according to the invention is used in a hands-free application in a car, it is possible to change the transient detector in such a way that it takes into account the eventual reverberation directions of signals. In such a case the detection of transients can be improved by attenuating several assumed loudspeaker arrival directions instead of one assumed loudspeaker arrival direction.

The advantages of a spatial speech activity detector according to the invention, compared with prior known methods are its capability of recognizing both double-talk situations and near-end speech activity, quickness and reliability. The detector of the invention based upon the directions of arrival of speech signals is very reliable due to its primary character. The differences between the power levels of speech signals do not have much effect on the result, but the detector recognizes also near-end speech signals having much lower power than a loudspeaker signal. In addition to it, the detection result is not affected by the operation of separate units, such as that of an adaptive echo canceller. In double-talk detectors there often are threshold levels dependent on speech signals and ambient noise level, based upon which threshold levels it is decided if a double-talk situation is concerned. The parameters of this detector are constant for a major part, and thus such a problem does not exist. By using an optional transient detector it is possible to increase the quickness of recognizing.

In the present hands-free equipment it is in any case performed many of the operations required by the spatial detector according to the invention, such as the detection of far-end speech activity and the estimating of ambient noise, and thus calculating operations already performed can be utilized in a detector according to the invention.

A detector according to the invention can be used in a hands-free equipment, for example in the car mounting kit of a mobile telephone or in the hands-free equipment of a car telephone (for example as a part of an echo canceller and transmitting logic). The invention is also suited for using in such so called hands-free telephone applications in which a hands-free equipment is included in a telephone.

Figure 6:
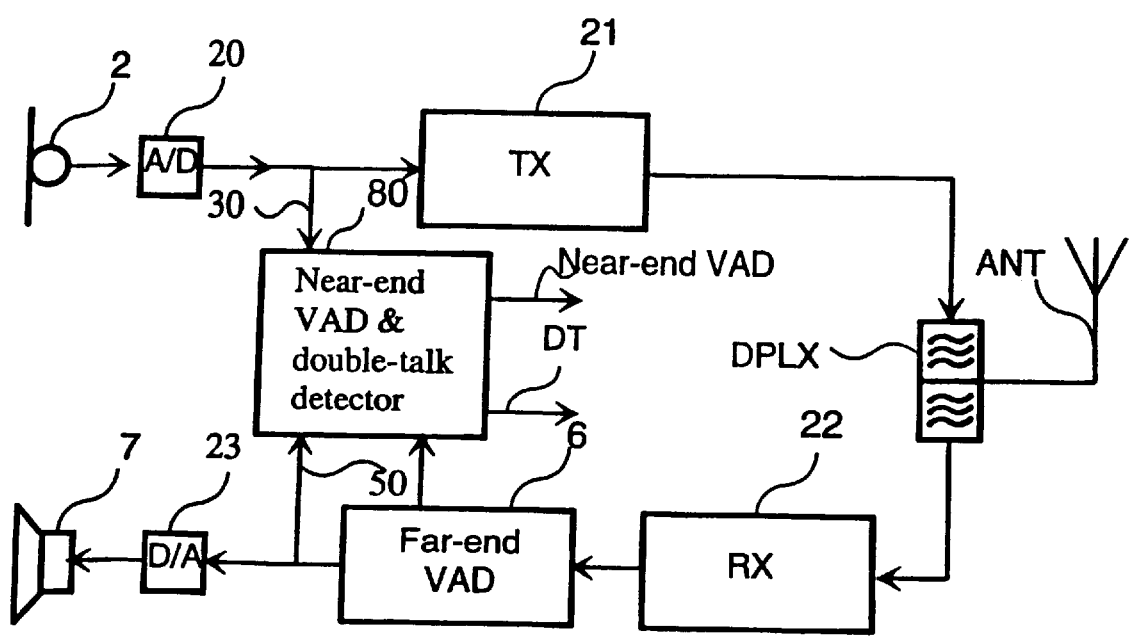
FIG. 6 presents a mobile station according to the invention.

FIG. 6 presents as an example a mobile station according to the invention, in which it is used spatial near-end speech/double-talk detector 80 according to the invention. A speech signal to be transmitted coming from microphone vector 2 is sampled with A/D-converter 20, after which it is performed the processing of a base-frequency signal (for example speech encoding, channel coding, interleaving), mixing and modulating into a radio frequency, and transmission in block TX. From block TX the signal is taken through duplex-filter DPLX and antenna ANT to the air path. Detector 80 can be used for example for controlling an echo canceller or for controlling transmission TX in a discontinuous transmission. At reception it is performed the usual operations of receiver branch RX, such as demodulation, cancelling of interleaving, channel decoding and speech decoding), after which the far-end speech activity is detected in detector 6 and the signal is converted into analog form in D/A-converter 23 and reproduced with loudspeaker 7. It is possible to realize the invention in a separate hands-free equipment by placing blocks 2, 7, 20, 23 and 80 according to FIG. 6 in a separate hands-free equipment having connections for a mobile station for the input, output and control signals (30, 50, near-end VAD, DT). The invention can further be used in such conference call equipment in which there are one or more microphones on a table and a loudspeaker for conference calls, or in connection with computers, for example for calls over Internet-network, in which the microphone and loudspeaker can be for example integrated in a video display unit. The invention is thus suited for all kinds of hands-free solutions.

The above is a description of the realization of the invention and its embodiments utilizing examples. It is self evident to persons skilled in the art that the invention is not limited to the details of the above presented examples and that the invention can be realized also in other embodiments without deviating from the characteristics of the invention. The presented embodiments should be regarded as illustrating but not limiting. Thus the possibilities to realize and use the invention are limited only by the enclosed claims. Thus different embodiments of the invention specified by the claims, also equivalent embodiments, are included in the scope of the invention.

What is claimed is:

1. A device for the detection of a source of a voice, the device comprising microphone means for receiving a voice signal and means for detecting a voice from a received voice signal, wherein the device further comprises:
    means for determining a direction of arrival of the received signal,
    means for storing an assumed direction of arrival of a certain source of voice;
    means for comparing the direction of arrival of said received signal and said assumed direction of arrival; and
    means for indicating that a source of the voice is said certain source when said comparison indicates that the direction of arrival of said received signal matches with said assumed direction of arrival within a certain tolerance, wherein the device further comprises in a certain direction to said microphone means:
        voice reproduction means for voice reproduction, and that said means for storing the assumed direction of arrival of a source have been arranged to store the assumed directions of arrival of the voices of at least two different sources, in which case a first source is the user of the device and a second source is said voice reproduction means and a first assumed direction of arrival is the assumed direction of arrival of the voice of the first source and a second assumed direction of arrival is the assumed direction of arrival of the voice of the second source, and means for detecting the source of a voice have been arranged to indicate the user of the device to be the source of the voice when said comparison indicates that the direction of arrival of said received signal is closer to said first than to said second assumed direction of arrival.

2. The device according to claim 1, wherein said microphone means comprise M (pieces of) microphones, where M is an integer, and said microphones have been arranged to produce as an output M microphone signals, and that the device comprises means for forming a spatial spectrum based upon said microphone signals and for determining said directions of arrival in said spectrum based upon peaks occurring in it.

3. The device according to claim 2, wherein it comprises means for determining said directions of arrival by calculating the derivate of said spectrum curve and by returning such zero-points of the derivate in which the derivate changes from positive to negative.

4. The device according to claim 1, wherein said means for detecting the source of a voice have been arranged to indicate such situations in which voice is coming simultaneously from said first source and from said second source.

5. The device according to claim 1, wherein it comprises means for two-way speech transfer, in which case the voice of said first source is the near-end speech to be transmitted and the voice of said second source is the received far-end speech which has been arranged to be reproduced using voice reproduction means.

6. The device according to claim 1 wherein the device is part of a voice activity detector.

7. A method for detecting the source of a voice, in which method:
    a voice signal is received and voice is detected from the received voice signal,
    the direction of arrival of the received signal is determined,
    the assumed direction of arrival of the voice of a certain source is stored,
    the direction of arrival of said received signal and said assumed direction of arrival is compared, and
    the source of the voice is indicated to be said certain source when said comparison indicates that the direction of arrival of said received signal matches with said assumed direction of arrival within a certain tolerance, the method further comprising:
        storing the assumed direction of arrival of voices of at least two different sources, wherein
            a first source comprises a user of a device and a second source is a voice reproduction means set in a certain direction to the first source, and
            a first assumed direction of arrival is the assumed direction of arrival of the voice of the first source and a second assumed direction of arrival is the assumed direction of arrival of the second source; and
        indicating the user of the device to be the source of the voice when said comparison indicates that the direction of arrival of said received signal is closer to said first than to said second assumed direction of arrival.

8. The method according to claim 7, wherein a voice signal is received from M microphones, in which M is an integer, and M microphone signals are supplied as the output of the microphones, the spatial spectrum of the direction of arrival is generated based upon said microphone signals and the direction of arrival is determined from said spectrum based upon said peaks occurring in it.

9. The method according to claim 7, wherein said direction of arrival is determined by calculating the derivate of said spectrum curve and by returning such zero-points of the derivate in which the derivate changes from positive to negative.

10. The method according to claim 8, wherein each peak of the spatial spectrum comprises a parameter describing the direction of arrival of the source, a parameter describing the probability of occurrence of said direction of arrival and a parameter describing the strength of the voice of the source and said direction of arrival of the source is determined by individually averaging a successive set of values for each parameter.

11. The method according to claim 7, wherein the detection of a source of a voice is used for voice activity detection.

* * * * *